United States Patent [19]

Hillmann

[11] Patent Number: 4,781,608
[45] Date of Patent: Nov. 1, 1988

[54] BUSBAR HOLDER OF PLASTIC

[75] Inventor: Willi Hillmann, Kamen, Fed. Rep. of Germany

[73] Assignee: Paul Vahle GmbH & Co. KG, Kamen, Fed. Rep. of Germany

[21] Appl. No.: 154,429

[22] Filed: Feb. 5, 1988

Related U.S. Application Data

[63] Continuation of Ser. No. 836,390, Mar. 5, 1986, abandoned.

[30] Foreign Application Priority Data

Apr. 3, 1985 [DE] Fed. Rep. of Germany ....... 3512161

[51] Int. Cl.$^4$ ................................................. A47F 5/08
[52] U.S. Cl. ..................................... 439/212; 211/94; 439/716
[58] Field of Search .................... 211/26, 94; 439/110, 439/114, 212, 213, 712, 713, 716

[56] References Cited

U.S. PATENT DOCUMENTS

| | | | |
|---|---|---|---|
| 1,652,825 | 12/1927 | Hechinger | 211/26 |
| 3,210,716 | 10/1965 | Meacham | 339/21 R |
| 3,463,967 | 8/1969 | Klein | 339/198 GA |
| 3,515,284 | 6/1970 | Taylor | 211/89 |
| 3,946,877 | 3/1976 | Galicia | 211/89 |
| 3,980,384 | 9/1976 | Lawson | 339/198 GA |
| 4,059,328 | 11/1977 | Rigo | 339/198 GA |

FOREIGN PATENT DOCUMENTS

| | | | |
|---|---|---|---|
| 924232 | 1/1955 | Fed. Rep. of Germany | 211/94 |
| 18373 | of 1902 | United Kingdom | 211/94 |

*Primary Examiner*—Eugene F. Desmond
*Assistant Examiner*—Gary F. Paumen
*Attorney, Agent, or Firm*—Max Fogiel

[57] ABSTRACT

A receptacle in the form of a clip for busbar holders that are made of plastic. The holder consists of a mounting plate that has margins which are inwardly recessed and project beyond their wider sides along its longitudinal edges. Each clip extends out of a web that fits under the recessed margins. The holders can be suspended and have parallel busbars. The ends of the webs, which constitute a component of the clips, are trimmed narrower. The webs are twice as long as the clips and have an extension that fits under the recessed margins of the mounting plate. The clips are cast onto one end of the webs with allowance left for the extension. The side of the webs that faces away from the clips has a positioning pin that extends into apertures provided for that purpose in the mounting plate.

6 Claims, 2 Drawing Sheets

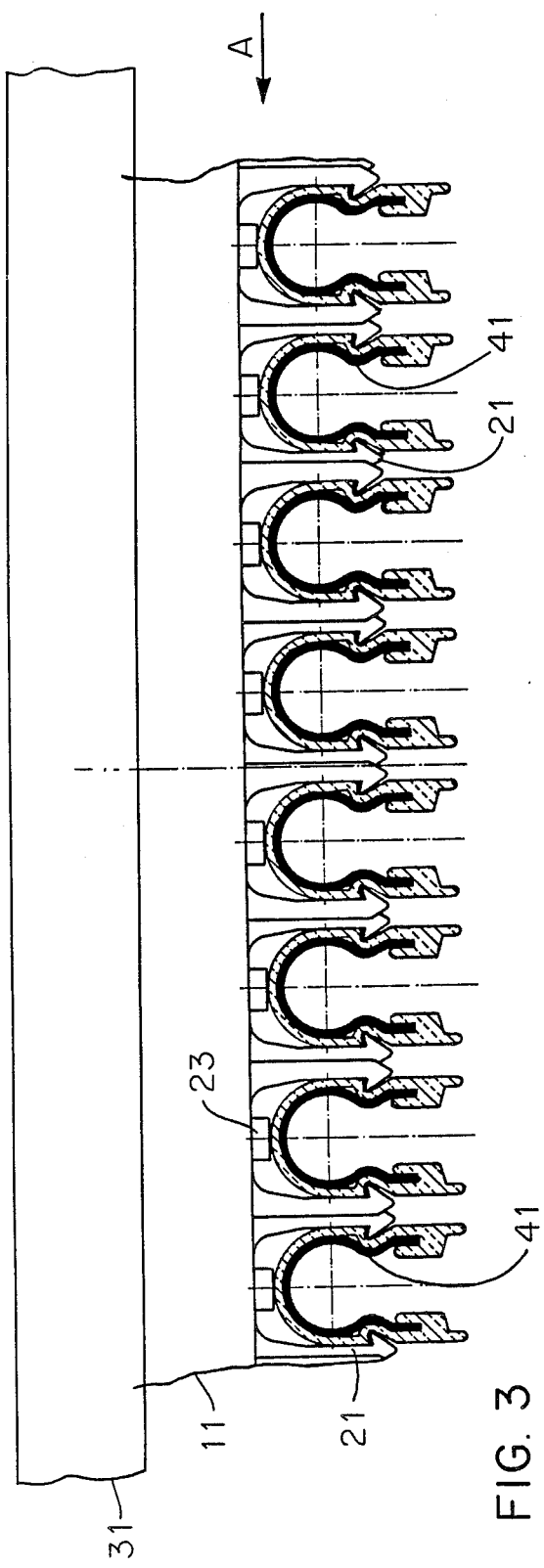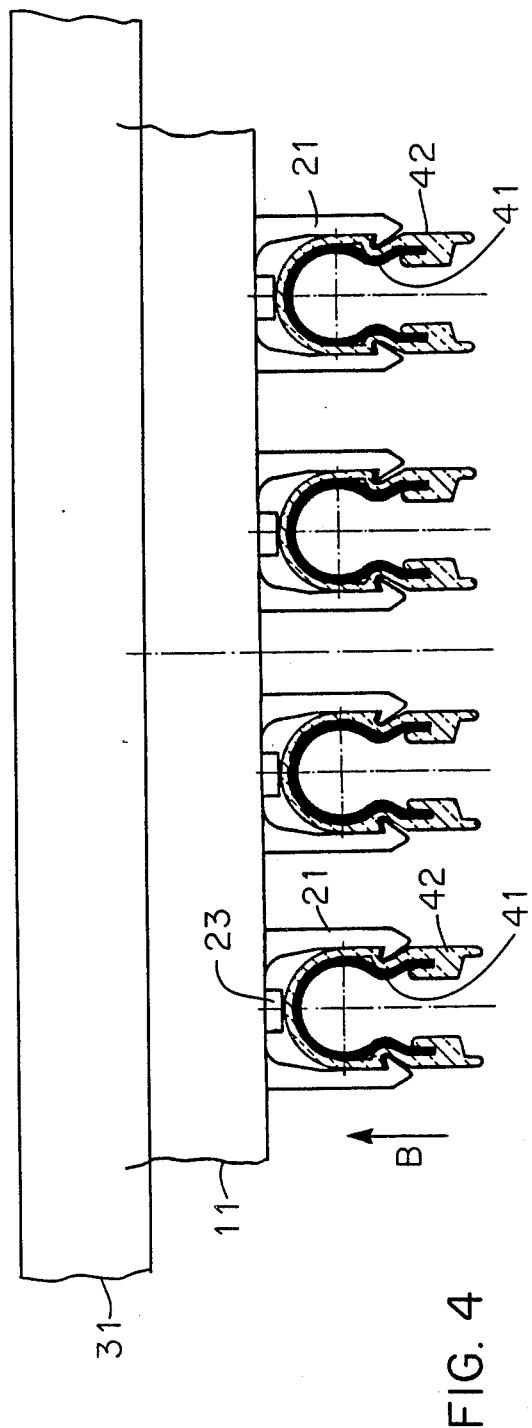
FIG. 3
FIG. 4

BUSBAR HOLDER OF PLASTIC

This is a continuation of patent application Ser. No. 836,390, filed Mar. 5, 1986, now abandoned.

BACKGROUND OF THE INVENTION

Busbar holders are generally offered today in the form of one-piece plastic castings. This entails the problem that only busbars of one particular size can be associated with one busbar holder, and holders for various sizes of busbar must on the whole be kept on hand. Thus, the available busbar holders of this type necessarily demand a considerable inventory. It is also impossible to assemble various busbars into one holder of this type. Furthermore, the distance between busbars in known busbar holders cannot be varied as desired, and the user is even warned to leave one empty holder between two full ones.

SUMMARY OF THE INVENTION

Employing the state of the art outlined in the foregoing as a point of departure, the object of the invention is to redesign such a busbar holder of plastic to the extent that it will allow latitude with respect to both the type of busbar to be mounted and the method of mounting them.

The busbar holders in accordance with the invention, which are available in various sizes that match busbars of different cross-section, are positioned on the mounting plate, snapped into the mounting plate, that is, as needed, whereby it is also possible to associate various-size busbars with one and the same mounting plate and to position the holders or busbars at any desired distance apart. This creates in a practical way a wide range of wiring possibilities at a comparatively smaller inventory.

If the webs that constitute a component of the clips that accommodate the busbars are twice as long as the clips and have an extension that fits under the recessed margins, and if the clips are cast onto one end of the webs with allowance left for the extension, the clips can be alternately associated with the mounting plate, which allows the clips to be packed onto the mounting plate very tightly without detriment to the ease with which the busbars can be mounted.

When the clips or busbar holders are to be positioned farther apart on the mounting plate, it has turned out to be practical to provide the side of the webs that faces away from the busbar holders with a positioning pin that extends in the assembled state into an aperture provided for that purpose in the mounting plate and constituting part of a master gauge for unambiguously positioning the individual busbar holders in the mounting plate.

The invention will now be described with reference to the drawing.

BRIEF DESCRIPTION OF THE DRAWINGS

FIG. 3 illustrates a mounting busbar holder with clips packed extremely tightly together, and FIG. 4 illustrates a mounted busbar holder with clips packed farther apart.

DESCRIPTION OF THE PREFERRED EMBODIMENTS

Figure 2:
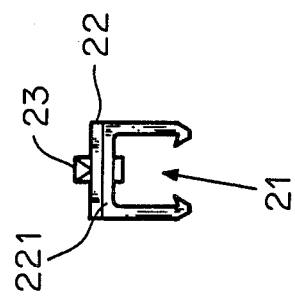
FIG. 2 is a front view of the clip that is a component of the the busbar holder.

The essentially rectangular mounting plate 11 has recessed (16) margins 14 and 14' along its longitudinal edges 12 and 12' that project beyond its wider side 13. Clips 21 that are cast onto webs 22, which are trimmed narrower at the end (221), are associated as needed with mounting plate 11. Component 21, 22 will be called a busbar holder in what follows.

Busbar holders 21, 22 are slid as needed into mounting plate 11 from one face of the plate (arrow A) or snapped into the plate (arrow B). The latter is possible when busbar holders 21, 22 have positioning pins 23 that can be inserted into apertures 17 provided for that purpose in mounting plate 11.

As will be evident from FIGS. 3 and 4, busbar holders 21, 22 can either be packed tightly together (FIG. 3) or at intervals (FIG. 4) on mounting plate 11. Furthermore, busbar holders 21, 22 with clips 21 designed for busbars with different cross-sections can be mounted on one and the same mounting plate 11.

Figure 1:
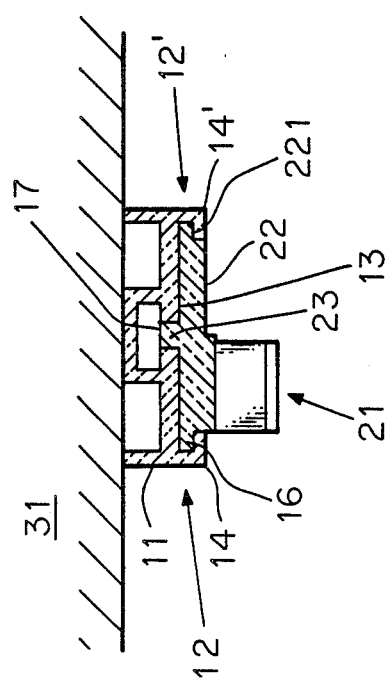
FIG. 1 is a section through the new busbar holder.

When busbar holders 21, 22 are packed tightly together on mounting plate 11, mounting the embodiment of the busbar holders 21, 22 illustrated in FIG. 1 on mounting plate 11 with clips 21 adjacent to first one (14) and then the other (14') margin is recommended. This facilitates subsequent mounting of the busbars 41 to be positioned in the clips.

A suspended installation 31 is illustrated in FIG. 1. The busbar holders can of course also be mounted on a wall.

I claim:

1. An arrangement for installation of a plurality of busbars extending next to each other and spaced from one another, comprising: a mounting plate with a substantially rectangular shape and marginal portions that are inwardly recessed and project beyond sides of said plate along longitudinal edges of said plate to form a receptacle; said plate having a backside fastenable to a mounting surface; a plurality of clips, each clip comprising a busbar holder extending out of a web that fits under said marginal portions and can be snapped into position, said busbar holder being formed on said web; said web being twice as long as the clip and having extensions that fit under said marginal portions of said mounting plate; said clip being arranged at one end of the web at a said extension; said mounting plate being bendable against spring resistance transverse to a longitudinal axis of said mounting plate, said web being snappable into position when said mountable plate is bent against said spring resistance.

2. An arrangement for installation of a plurality of busbars extending next to each other and spaced from one another, comprising: a mounting plate with a substantially rectangular shape and marginal portions that are inwardly recessed and project beyond sides of said plate along longitudinal edges of said plate to form a receptacle; said plate having a backside fastenable to a mounting surface; a plurality of clips, each clip being a one-piece member and comprising a busbar holder which holds a busbar by itself, said bushbar holder extending out of a web that fits under said marginal portions and can be snapped into position, said busbar holder being formed on said web; said web being twice as long as the clip and having extensions that fit under said marginal portions of said mounting plate; said clip being arranged at one end of the web at a said extension;

adjacent clips being positionable in alternating staggered relationship on alternate extensions so that said clips are expandable for holding busbars when said clips are arranged densely next to one another on said mounting plate.

3. An arrangement as defined in claim 2, wherein surfaces of said web mesh with surfaces of said marginal portions of said mounting plate, said extensions of said web which fit under said marginal portions of said mounting plate being trimmed.

4. An arrangement as defined in claim 2, including a guide pin in substantially the center of each said web on a side opposite said clip, said mounting plate having a plurality of spaced apertures along the length thereof, said pin being insertable into said apertures.

5. An arrangement as defined in claim 4, wherein said apertures are produced from previously stamped out elements for receiving said guide pin.

6. A plastic means for holding busbars, comprising a substantially rectangular mounting plate with recessed marginal portions along longitudinal edges projecting beyond a side of said mounting plate; one-piece clips, each being adapted to hold a busbar by itself, said clips being formed onto webs trimmed at ends thereof; said webs having extensions protruding into recesses of said marginal portions of said mounting plate, said webs being twice as long as said clips and fitting into said marginal portions with space gaps being left between ends of said extensions and interior walls of said recesses; said webs with said clips being slidable into said mounting plate from one face of said plate and being snappable into position; said webs having guide pins centered on said webs and insertable into apertures in said mounting plate; adjacent clips being positionable in alternating staggered relationship on alternate extensions so that said clips are expandable for holding busbars when said clips are arranged densely next to one another on said mounting plate.

* * * * *